(12) United States Patent
Kim et al.

(10) Patent No.: US 9,565,602 B2
(45) Date of Patent: Feb. 7, 2017

(54) METHOD AND APPARATUS FOR RECORDING CHANNEL MEASUREMENT INFORMATION IN A MOBILE COMMUNICATION SYSTEM

(75) Inventors: Sang Bum Kim, Seoul (KR); Soeng Hun Kim, Yongin-si (KR); Kyeong In Jeong, Suwon-si (KR); Jung Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 13/643,428

(22) PCT Filed: May 4, 2011

(86) PCT No.: PCT/KR2011/003335
§ 371 (c)(1),
(2), (4) Date: Oct. 25, 2012

(87) PCT Pub. No.: WO2011/139088
PCT Pub. Date: Nov. 10, 2011

(65) Prior Publication Data
US 2013/0045735 A1    Feb. 21, 2013

(30) Foreign Application Priority Data

May 4, 2010   (KR) .................. 10-2010-0041660
Oct. 4, 2010   (KR) .................. 10-2010-0096504

(51) Int. Cl.
*H04W 24/10*   (2009.01)
*H04W 36/00*   (2009.01)
(Continued)

(52) U.S. Cl.
CPC ......... *H04W 36/0094* (2013.01); *H04W 24/10* (2013.01); *H04W 8/26* (2013.01); *H04W 48/02* (2013.01)

(58) Field of Classification Search
CPC ...... H04W 24/10; H04W 36/26; H04W 36/30; H04W 36/0083; H04W 36/0088; H04W 36/0099; H04W 48/16; H04W 48/17; H04W 48/18; H04W 48/20; H04W 52/0225; H04W 52/0241; H04W 52/0245
(Continued)

(56) References Cited

U.S. PATENT DOCUMENTS

2005/0042987 A1    2/2005  Lee et al.
2005/0113117 A1*   5/2005  Bolin et al. ................ 455/456.6
(Continued)

FOREIGN PATENT DOCUMENTS

WO    00-70897 A1    11/2000

OTHER PUBLICATIONS

3GPP TR 36.805 (V2.0.0), "Study on Minimization of drive-test in Next Generation Networks", Dec. 31, 2009.
(Continued)

*Primary Examiner* — Erica Navar
(74) *Attorney, Agent, or Firm* — Jefferson IP Law, LLP

(57) ABSTRACT

The present invention relates to a method and apparatus for efficiently configuring information during a process in which a terminal records channel measurement information in a mobile communication system. Disclosed is an operation of a terminal for accurately indicating to a base station whether or not a serving cell or neighbor cells are measured in configuring channel measurement information. In addition, disclosed is a method in which a terminal adjusts the frequency of recording in consideration of the importance of the measured information.

12 Claims, 10 Drawing Sheets

(51) Int. Cl.
*H04W 8/26* (2009.01)
*H04W 48/02* (2009.01)

(58) Field of Classification Search
USPC ... 455/422.1, 424, 432.1, 435.1, 435.2, 434, 455/436, 437, 439, 442, 443, 525
See application file for complete search history.

(56) References Cited

U.S. PATENT DOCUMENTS

2009/0036116 A1 2/2009 Kim et al.
2011/0243097 A1* 10/2011 Lindqvist et al. ............ 370/331

OTHER PUBLICATIONS

Introduction of idle mode measurements, 3GPP Draft; R2-102358 Idle Mode Measurements, 3rd Generation Partnership Project (3GPP), Apr. 2010.
Nokia Siemens Networks et al: "Architectures comparison", 3GPP Draft; R2-097020 MDT Architecture 2, Comparison, 3rd Generation Partnership Project (3GPP), Nov. 2009.
Huawei: "Idle mode MDT text proposals for stage 2 TS", 3GPP Draft; R2-103199 Idle Mode MDT Text Proposals for Stage 2 TS, 3rd Generation Partnership Project (3GPP), May 2010.
"Handling coverage hole case for logged MDT", 3GPP Draft; R2-103924, 3rd Generation Partnership Project (3GPP), Jun. 2010.
LG Electronics Inc: "On the need of MDT logging during OOS", 3GPP Draft; R2-104840 on the Need of MDT Logging During OOS, 3rd Generation Partnership Project (3GPP), Aug. 2010.
Research in Motion UK Limited: "Reporting of Neighbour Cell in Logged MDT", 3GPP Draft; R2-105696, 3rd Generation Partnership Project (3GPP), Oct. 2010.
3GPP, "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP TS 37320 V0.4.0, Apr. 27, 2010.
Nokia Corporation et al., "UE power consumption considerations on idle logging for drive test minimisation", 3GPP TSG-RAN WG2 Meeting #69bis, R2-102078, Apr. 12-16, 2010.
Huawei, "UE RLF report", 3GPP TSG-RAN WG2 Meeting #69bis R2-102018, Apr. 12-16, 2010.

* cited by examiner

METHOD AND APPARATUS FOR RECORDING CHANNEL MEASUREMENT INFORMATION IN A MOBILE COMMUNICATION SYSTEM

BACKGROUND OF THE INVENTION

Field of the Invention

The present invention relates to a method and apparatus for configuring information efficiently in logging channel measurement information in a mobile communication system. In more particular, the present invention discloses a terminal operation of indicating to a base station whether the measurement has been performed to a serving cell or neighbor cells for configuration of the channel measurement information. Also, the present invention proposes a method for a terminal to adjust the frequency of log in consideration of the importance of the measurement information.

Description of the Related Art

Typically, the mobile communication system has been developed for the user to communicate on the move. With the rapid advance of technologies, the mobile communication system has evolved to the level capable of providing high speed data communication service as well as voice communication service. Recently, the 3GPP, as one of the next generation mobile communication standardization organizations, is in the progress of standardization of Long Term Evolution-Advanced (LTE-A). LTE-A is one of the high speed packet-based communication technologies supporting data rate higher than that of the current mobile communication technology under the objective to complete the standardization in late 2010.

With the evolvement of the 3GPP standard, many discussions are being conducted for optimizing the radio network in addition to the effort for increasing data rate. In the initial radio network configuration or optimization stage, a base station or a base station controller should collect radio environment information related to its own cell coverage, and this process is called Drive Test. Since the conventional drive test is performed in such a way that an operator carries the test apparatuses on a vehicle while performing the measurement task repeatedly for long time. The measurement result is used to configure the system parameters of the base stations or base station controllers. Such a conventional drive test increases total costs and time of the radio network optimization and maintenance. Study on minimization of drive tests and enhancement of radio environment analysis process and manual configuration is being conducted in the name of MDT (Minimization of Drive Test). In order to accomplish the aforementioned purposes, the UE measures radio channels and reports the radio channel measurement information to the eNB periodically at an interval or immediately in response to a specific event or after a predetermined time has elapsed from the time point when the radio channel measurement information has been recorded, instead of performing the drive test. In the following description, the process for the UE to transmit the radio channel measurement information and other supplementary information to the eNB is called MDT measurement information report. In this case, the UE reports the channel measurement result immediately right after the completion of channel measurement in a state where the communication is available with the eNB but deters the report in a state where the communication is not available with the eNB until the connection to the eNB is recovered. The eNB uses the MDT measurement information received from the UE for cell coverage optimization. In LTE-A, basic MDT measurement information report operations are classified according to the UE RRC state as shown in table 1.

TABLE 1

| UE RRC state | UE MDT measurement information report operation |
| --- | --- |
| Idle mode | Logging and deferred reporting |
| Connected mode | Immediate report |
| Connected mode | Logging and deferred report |

Table 1 shows the basic MDT information report operation depending on the RRC state of the UE.

In table 1, if the UE is not communicating with the eNB, the UE is in the idle mode and, otherwise, in connected mode. In the case of MDT, the channel information measured by the UE is supposed to be transmitted through RRC signaling such that, although the UE is in the idle mode, it is not necessary to transition to the connected mode for information transmission. In this case, the UE logs the channel measurement information and defers the transmission of the information until it transitions to the connected mode.

Although if necessary it is possible to transmit the channel measurement information to the eNB immediately even in the connected mode, the UE can defer the transmission of the measurement information logged in the idle mode until it transitions to the connected mode. The eNB requests for the measurement information report such that the corresponding UE transmits the logged measurement information.

The UE in the idle mode logs channel measurement information periodically or when a certain event triggering channel measurement information log occurs. The exemplary channel measurement information log-triggering events are as follows.

(1) Periodic downlink pilot measurement
(2) Serving Cell becomes worse than threshold
(3) Transmit power headroom becomes less than less than threshold
(4) Paging Channel Failure
(5) Broadcast Channel failure
(6) Random access failure
(7) Radio link failure report It is expected that the MDT measurement and log information configuration method is defined by taking notice of the conventional RRC measurement method. However, unlike the conventional RRC measurement method perform with the assumption of the existence of a serving cell, the MDT measurement is performed regardless of the existence of serving cell. This is because since the MDT measurement information is supposed to be used for cell area optimization other than supporting mobility the UE has to measure the signals from the adjacent eNBs even in service coverage hole. In the RRC measurement procedure, the measurement result report includes the serving measurement result and neighbor cell measurement results. If this operation mechanism is applied to the MDT measurement report without modification, it may fail logging the serving cell measurement information in a certain case, resulting in confusion. There is therefore a need to define a detailed operation for this.

The convention RRC measurement method is provided with an algorithm for limiting the cell measurement range in order to minimize the power consumption of the UE in the idle mode. The RRC measurement aims to check the signal qualities of the neighbor cells as well as the serving cell in order for the UE to attach to the best cell. If the condition of the serving cell lower than a predetermined threshold and a neighbor cell has the better signal quality, the UE attempts access to the corresponding cell. If the signal quality of the serving cells is equal to or higher than the threshold, there is no need of checking the signal condition of neighbor cells consuming UE power unnecessarily. Accordingly, if the signal strength of the serving cells is equal to or greater than a predetermined threshold, no neighbor cell signal measurement is performed in the RRC measurement method. The UE selects the neighbor cell for measurement in stepwise manner using two threshold values of Sintrasearch and Snonintrasearch.

FIG. 1 shows a UE measurement operation in the idle mode according to two threshold values. If the Reference Signal Received Power (RSRP) 115 of the serving cell is greater than Sintrasearch 105, the UE does not measure the signals of neighbor cells. This is because the current serving cells has the signal quality good enough. Otherwise, if the RSRP of the serving cell is equal to or less than Sintrasearch 105 and greater than Snonintrasearch 110, the UE measures the signals of the neighbor cells operating on the same frequency of the serving cell. if the RSRB of the serving cell is less than Snonintrasearch 110, the UE measures the signals of cells operating on other frequencies and other systems.

The MDT measurement method is likely to be designed to operate in similar manner to the RRC measurement method and employ the two threshold values of Sintrasearch and Snonintrasearch, as they were, to reduce power consumption of the UE. However, since the MDT measurement is focused on the cell area optimization other than mobility support, there is no need of knowing why there is no measurement result of the neighbor cells in the log unlike the conventional RRC measurement. This means that there is a need of the information indicating the reason of the absence of measurement result, i.e. whether the measurement result is absent due to the signal strength of the serving cell which is good enough or the measurement to the neighbor cells is not performed actually.

Meanwhile, the location information is one of the important elements in MDT measurement. It fails to receive GPS-based location information, the UE measures a set of the received signal strengths from neighbor eNBs and sends the measurement result to the serving eNB. The eNB calculates an approximate measurement location using the triangulation with the received signal strength set received form the UE. If the RSRP of the serving cell is greater than Sintrasearch, there is no chance to measure the neighbor cells and thus it is impossible to measure and log a set of the signal strengths of the neighbor cells for use in location information acquisition. At this time, since the MDT measurement without location information degrades the usability, it is not preferred to perform logging periodically and thus increase the UE and signaling overheads.

DISCLOSURE OF INVENTION

Technical Problem

The present invention has been made in an effort to solve the above problem, and it is an object of the present invention to providing a method and apparatus for a UE to configure the channel measurement information efficiently. Particularly, it is another object of the present invention to provide a method and apparatus for the UE to report the presence or absence of measurement to the serving cell or neighbor cells in the channel measurement information configuration and adjust the frequency of log.

Solution to Problem

In order to solve the above problem, a channel measurement information log method of a terminal in a mobile communication system includes receiving measurement configuration information from a base station; measuring serving and neighbor cells based on the measurement configuration information; and logging channel measurement information including at least one of measurement results associated with the serving and neighbor cells.

Also, an apparatus for logging channel measurement information in a mobile communication a measurer which measures serving and neighbor cells; a controller which controls the measurer to measure the serving and neighbor cells based on measurement configuration received from a base station and logs channel measurement information including at least one of measurement results of the serving and neighbor cells; and a buffer which stores the logged channel measurement information.

Advantageous Effects

According to the present invention, the UE which has performed channel measurement is capable of reporting accurate information on whether the serving cell exists or whether the neighbor cells have been measured.

BRIEF DESCRIPTION OF THE DRAWINGS

In FIG. 8, it is assumed that the UE moves from left to right.

DETAILED DESCRIPTION OF EXEMPLARY EMBODIMENTS

The present invention relates to an improved information configuration method and apparatus in the UE procedure for logging the channel measurement information in the mobile communication system. The present invention provides the UE operation for notifying the eNB of the presence or absence of the channel measurement on the serving or neighbor cell exactly. Also, the present invention proposes a method for the UE to adjust the frequency of logging in consideration of the importance of the measurement information.

Figure 1:
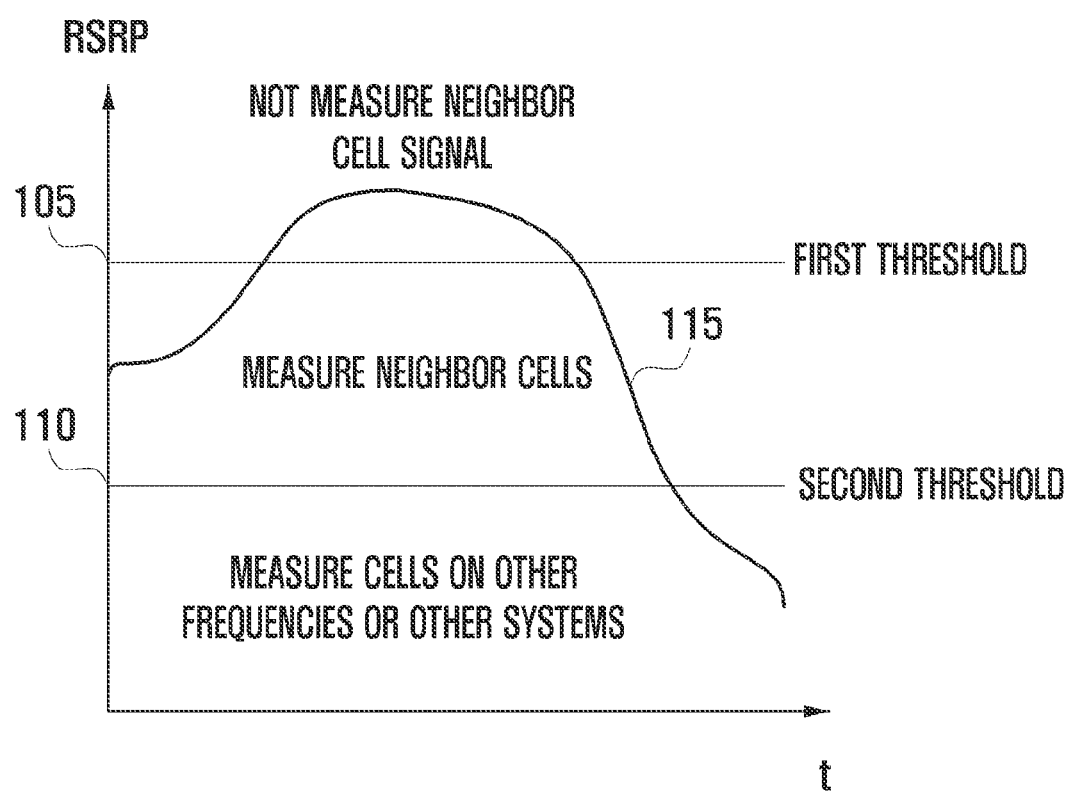
FIG. 1 is a drawing illustrating measurement operation of the UE in idle mode with two threshold values.
Figure 2:
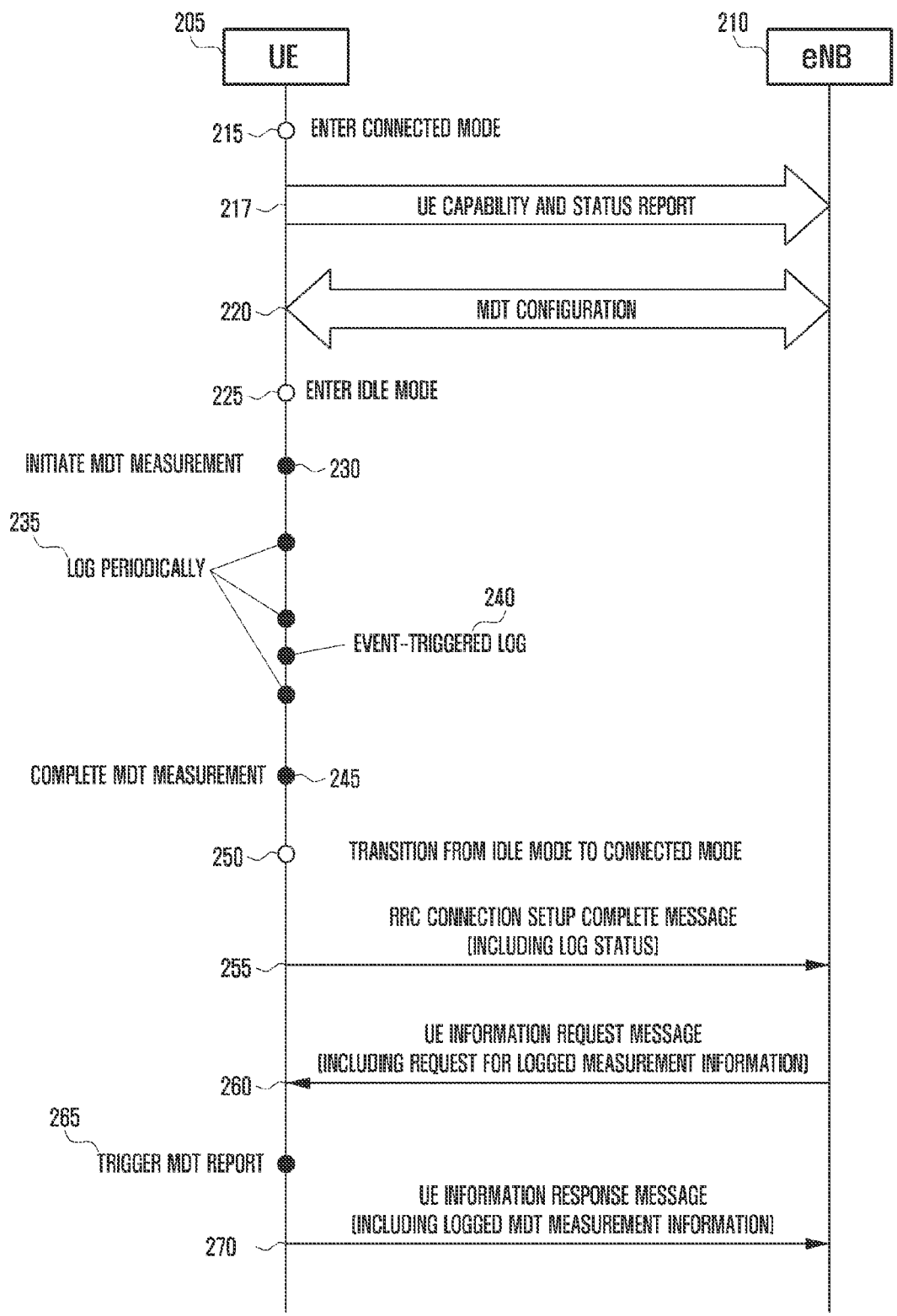
FIG. 2 is a message signaling diagram illustrating a UE 205 procedure for reporting the channel information measured and logged according to the MDT execution command from the eNB 210.

FIG. 2 is a message signaling diagram illustrating a UE 205 procedure for reporting the channel information measured and logged according to the MDT execution command from the eNB 210.

The UE 205 enters the connected mode to communicate with the eNB 210 at step 215. The UE 205 is capable of notifying the eNB 210 of the UE capability or UE status according to the request from the eNB 210 at step 217. The UE capability such as the presence or absence of GPS capability can be considered in determining whether to instruct the UE to perform MDT. Also, the UE status report can be considered to in determining whether to instruct the UE to perform MDT. In an exemplary UE status report, when there is a UE request triggered according to equation (1), the UE is capable of reporting the residual power amount (i.e. battery statue).

$$UE\text{ information response} = [\text{current battery status, average battery consumption during the last } x \text{ hours}] \quad \text{Equation (1)}$$

In equation (1), 'current battery status' denotes the current residual power amount of the UE. Another value 'average battery consumption during the last x hours' denotes the average power consumption amount of the UE during x hours. This value means the power consumption rate of the UE 205 at the near past.

If it is determined that the UE 205 in the idle mode is required to perform MDT measurement, the eNB 210 performs MDT configuration at step 220. That is, the eNB sends the UE 205 the measurement configuration information necessary for MDT measurement. Afterward, the UE 205 enters the idle mode at step 225. Once it enters the idle mode, the UE 205 starts MDT measurement at step 230.

The MDT is performed for initial deployment of radio network and network optimization. And thus, the MDT is performed for a specific duration. Accordingly, it is necessary for the eNB 210 to notify the UE 205 of the MDT measurement initiation time in the MDT configuration procedure. In the case that the UE 205 is in the connected mode, the enb 210 is capable of signaling the measurement end time to the UE 205 accurately. In the case that the UE 205 is in the idle mode, however, it is impossible for the eNB 210 to signal the MDT measurement end time to the UE 205 and thus the eNB 210 notifies the UE 205 of a timer information to terminate MDT measurement upon expiry of the timer. Accordingly, if a signal instructing to stop MDT measurement is received before the expiry of the timer while operating in the connected mode, the eNB 205 stops the MDT measurement immediately and, otherwise if not termination signal is received, continues measurement and ends the measurement at the expiry of the timer at step 245. The UE 205 logs the information measured in the MDT measurement duration periodically at step 240.

If the indicated execution period ends, the UE 205 terminates the MDT measurement at step 245.

Afterward, the UE 205 determines transition to the connected mode at step 250. After entering the connected mode, the UE 205 is capable of transmitting the channel measurement information logged in the idle mode to the eNB 210.

Prior to the report, the UE 205 transmits the status information on the logged channel measurement information in the RRC Connection Setup Complete (RRCConnectionSetupComplete) message at step 255. In this case, it is not preferred for the UE 205 to include too much information in the status information message transmitted to the eNB 210. That is, it is preferred to transmit only the essentially necessary information. For example, it is possible to notify of the information on whether the UE 205 is in performing MDT and whether there is logged information to be reported, with two bits. The reason of transmitting such indication information is to notify the eNB 210 of the details of the channel measurement information logged by the UE 205 such that the eNB 210 determines, based on the received status information, whether to request for the channel measurement information.

For example, if the UE 205 has been stayed in the idle mode for a long time, there may be large amount of channel measurement information logged. If it enters the connected mode in this state, the UE 205 has to consume large amount of resource for transmitting the logged information. In order to overcome this problem, the eNB 210 checks the necessary information for request in advance.

If it is determined that the channel measurement information logged by the UE 205 is useful, the eNB 210 request for the MDT measurement information by transmitting to UE Information Request message (UEInformationRequest) at an appropriate timing at step 260. If the Information Request message is received from the eNB 210 and if the Data Radio Bearer (DRB) for normal data has released entirely, the UE 205 transmits the MDT measurement information to the eNB 210 at step 265. This means that the priority of the normal data transmission is higher than that of the measurement information transmission. This is because the logged measurement information is not necessary to be transmitted urgently. In another approach, it is possible to introduce an extra Radio Barrier (RB) having low priority for use in MDT measurement information transmission. The UE 205 transmits the MDT measurement information to the eNB 210 in a UE Information Response message (UEInformationResponse).

For the MDT measurement information transmission procedure of FIG. 2, it is expected that the channel measurement information configuration is defined by taking notice of the conventional RRC measurement. At this time, the items to be considered in MDT measurement information configuration for the MDT supportability and performance improvement, as compared to the RRC measurement information configuration, can be summarized as follows.

1) Configure information for indicating no existence of serving cell measurement information 2) Configure information indicating whether to measure neighbor cell signals according to the signal strength of the serving cell.

3) Method for adjusting frequency of log of the information with low usability

The present invention defines the UE operation and configures the information configuration by taking notice of the above described items.

In the case that the MDT measurement result is configured in the similar way to the conventional RRC measurement result, the MDT measurement result is configured with the following informations.

MDT measurement result=[serving cell measurement result, neighbor cell measurement results, serving cell ECGI, other informations]

Here, the serving cell measurement result is the measurement value of the signal strength of a predetermined signal such as common pilot signal of the serving cell. The neighbor cell measurement results are a set of a predetermined number of neighbor cell measurement results determined in the order of signal strength level. The neighbor cell measurement result can be configured as follows.

Neighbor cell measurement result=[physical layer cell identifier of corresponding cell (PCI, Physical Cell Id), signal strength of predetermined signal of corresponding cell]

The serving cell ECGI (EUTRAN Cell Global Id) is a cell identifier provided in the system information, and the network entity such as MDT server can be identified with the ECGI.

The MDT server is capable of performing cell optimization using the MDT measurement result (i.e. serving cell measurement result, neighbor cell measurement results, serving cell ECGI, other information) provided by the UE.

At this time, the MDT server is capable of determine whether there is a coverage hole using the serving cell measurement result and the neighbor cell measurement result. The MDT server is also capable of checking the location of the coverage hole with the serving cell ECGI and the serving and neighbor cell measurement results. The location information can be acquired with so called triangulation technique. For example, by referencing the absolute location of the cell matching the ECGI, the neighbor cell having the PCI matching the PCI reported as the neighbor cell measurement result value in the MDT measurement result among the neighbor cells around the cell of which absolute location is acquired. The signal strength measurement results of the selected neighbor cells are used in the triangulation.

Meanwhile, the UE can be configured to perform MDT measurement periodically and log the measurement result in the idle state. For example, if it transitions to the idle state at a certain time after the MDT measurement configuration, the UE measures the signal strength of the serving and neighbor cells and logs the measurements in a predetermined format at a predetermined interval.

There may be the situation where no serving cell exists at the MDT measurement occasion. At this time, if the serving cell measurement result and the serving cell ECGI information are not included in the MDT measurement result, the MDT server cannot estimate the location where the corresponding measurement result has been logged. The cell of which signal strength is equal to or greater than a predetermined threshold value and best in channel quality among the cells not access-barred is selected as the serving cell. Accordingly, if there is no cell of which signal strength is equal to or greater than a predetermined threshold value (S-criteria, see 36.304) or if although there exists any all the cells are access-barred, there may be no serving cell.

In the present invention, for the above situation where there is no serving cell exists, the MDT measurement result includes the information indicating the reason of the absence of the serving cell, i.e. because there is no cell of which signal strength is equal to or greater than a predetermined threshold value (S-criteria)(Indication 1) or because all cells of which signal strength is equal to or greater than the threshold value are access-barred cells (Indication 2).

Figure 3:
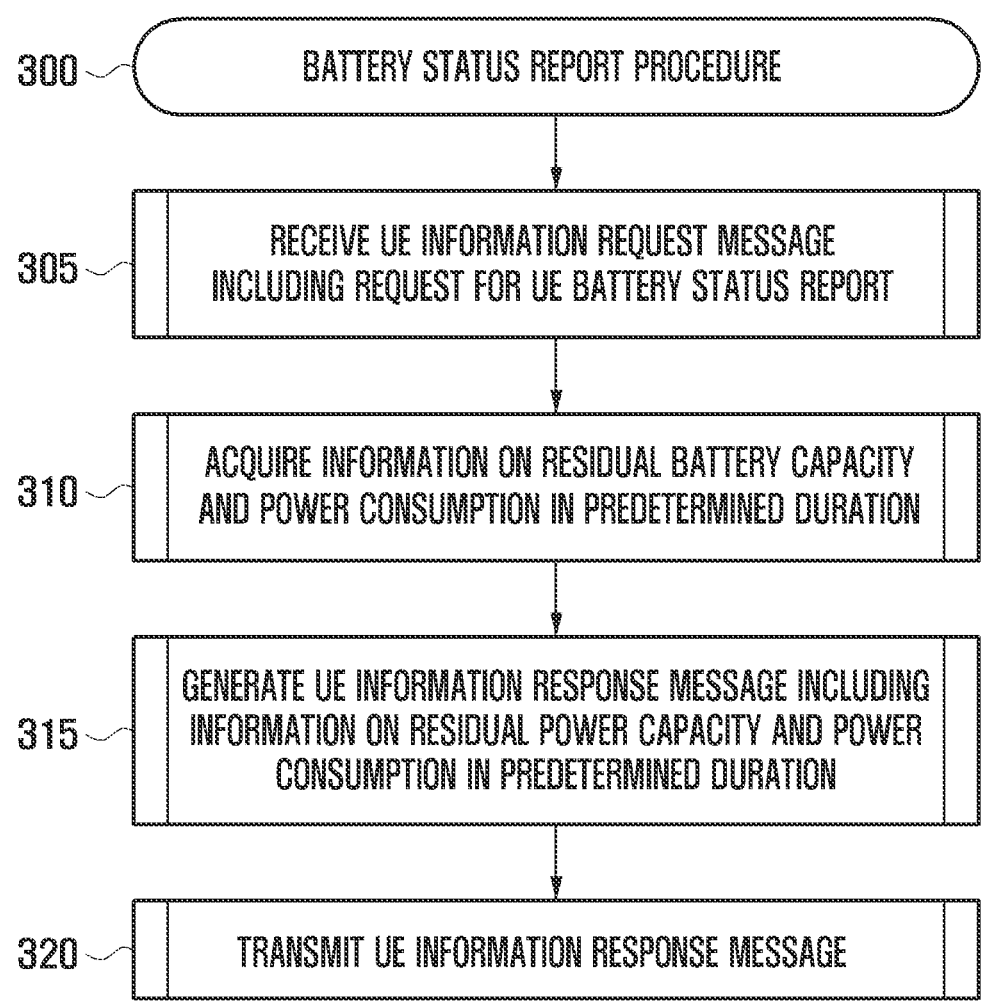
FIG. 3 is a flowchart illustrating the operation flow of the UE which reports the battery status to the eNB for MDT measurement configuration.

FIG. 3 is a flowchart illustrating the operation flow of the UE which reports the battery status to the eNB for MDT measurement configuration. The UE operation flow depicted in FIG. 3 may be the detail of the UE procedure for reporting the UE status (here, UE's battery status) to the eNB at step 217 of FIG. 2.

The UE receives a control message instructing the battery status report at step 305. The control message can be an extension of the UE Information Request message (UEInformationRequest) specified in 36.331. For example, this message can be reused by defining an indicator indicating whether the battery status is requested.

The UE checks the residual battery capacity at a certain time and configures remaining batter power information. At that time point, the UE checks the battery consumption for predetermined time duration (e.g. n hours). This information may be the total battery consumption amount for the predetermined time duration and an average battery consumption amount. The battery consumption amount is configured as battery power consumption during the last predetermined period. The UE generates an RRC message including the remaining battery power and battery power consumption during the last predetermined period at step 315. The RRC message can be a UE information Response message (UEInformationResponse) specified in 36.331.

Next, the terminal transmits the RRC control message at step 320.

Figure 4:
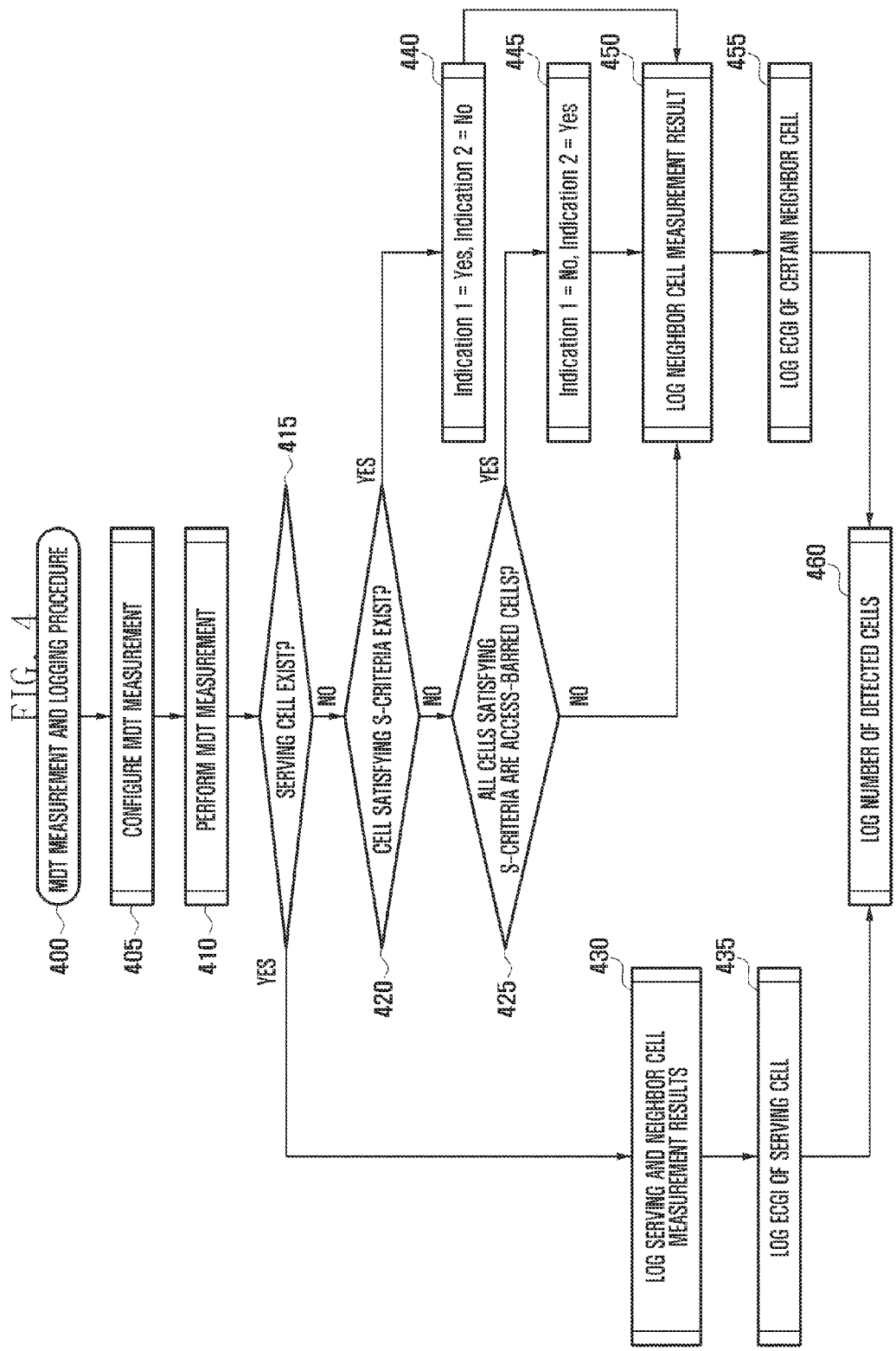
FIG. 4 is a flowchart illustrating a MDT measurement procedure of the UE according to an embodiment of the present invention.

FIG. 4 is a flowchart illustrating a MDT measurement procedure of the UE according to an embodiment of the present invention.

The UE first receives an MDT measurement configuration message from the eNB and configures MDT measurement at step 405. If it is configured to perform the MDT measurement in the idle mode, the UE waits until the RRC connection is released and starts MDT measurement at step 410.

The MDT measurement can be of measuring the signal strength of a cell (serving cell or neighbor cells) and logging the measurement result periodically. If the MDT measurement occasion arrives, the UE checks whether there is a serving cell at the corresponding time point at step 415. If the serving cell exists, the UE measures the signal strength of the serving and neighbor cells and logs the result value as the MDT measurement result at step 430. Next, the UE logs the ECGI of the serving cell in the measurement result at step 435.

Otherwise, if no serving cell exists at step 415, the UE determines whether the reason of the absence of the serving cell is because there is no cell of which signal strength is equal to or greater than a predetermined threshold value (s-criteria) at step 420. If so, the UE sets the serving cell absence indicator (or indication 1) to YES and the access barring indicator (or indication 2) to NO in the MDT measurement result at step 440.

Otherwise, if no serving exists even though there is the cell satisfying s-criteria, the UE determines whether all cells satisfying the s-criteria are access-barred cells at step 425. Whether a cell is access-barred is determined by analyzing the access barring information provided in the system information. If all cells satisfying the s-criteria are access-barred cells at step 425, the UE sets indication to no and indication to yes at step 445.

Next, the UE logs the measurement result value of the neighbor cells in the MDT measurement result at step 450. The UE selects one of the neighbor cells and logs the ECGI of the selected cell in the MDT measurement result. The neighbor cell of which ECGI is logged may be the neighbor cell having the strongest signal strength. Or, the neighbor cell may be the neighbor cell of which ECGI has been already acquired. In the latter case, the UE logs the information indicating the neighbor cell matching the ECGI, i.e. PCI corresponding to the ECGI.

Next, the UE logs a number of cells of which signal strengths have been measured at the corresponding time point and terminates the MDT measurement logging procedure at step 460. If a certain cell is measured at a certain time point, this means that the corresponding cell is detected. Accordingly, it can be expressed that the UE logs a number of detected cells at the corresponding time, at step 460.

The reason of recording the number of detected cells as follows. The UE in the idle mode performs measurement to the serving cell continuously but measurement to the neighbor cells only when the channel condition of the serving cell is equal to or less than a predetermined threshold. That is, if the channel condition of the serving cell is good enough, there may be no neighbor cell measurement result. Accordingly, if the MDT measurement result logged at a certain time point includes not neighbor cell measurement result or if the number of the neighbor cell measurement results is less than a predetermined value, this means that the neighbor cell measurement has not been performed due to the good channel condition of the serving cell, the neighbor cell measurement results are not enough in number due to the relatively recent start of measurement, or the actual number of the neighbor cells is small in number.

The network entity which has taken the action necessary according to the MDT measurement result is capable of discriminating between the two cases based on the number of detected cells. The UE is capable of logging the MDT measurement result with the configuration of the neighbor cell measurement indicator (or indication3). The indication 3 is the indicator indicating whether the channel condition of the serving cell is higher or lower than the threshold value (Sintrasearch or Sintersearch, see 36.304) for controlling whether to perform the neighbor cell measurement. That is, the indication 3 is the indicator indicating whether the measurement to the neighbor cell has been performed at the corresponding time point. If the signal strength of the serving cell is greater than the threshold value, i.e. the neighbor cell measurement has not been performed, the UE sets the indication 3 to YES; and if the signal strength of the serving cell is less than the threshold value, the UE set the indication 3 to NO.

In more detail, the MDT measurement result of the present invention is configured as follows.

MDT measurement result=[serving cell measurement result, neighbor cell measurement results, ECGI, PCI matching ECGI, indication 1, indication 2, indication 3, number of detected cells]

The ECGI can be the ECGI of the serving cell or, if no serving cell exists, the ECGI of the cell corresponding to the PCI indicated in the PCI corresponding to the ECGI.

Since, the indication 1 and indication 2 have been described already as the indicators for in the case where not serving cell exist, detailed descriptions thereon are omitted herein.

The description on the number of detected cells is omitted too herein.

A description is made on the UE operation in the case of using the format of the MDT measurement result having no measurement result on the serving cell according to another embodiment of the present invention. At this time, the MDT measurement result is configured as follows.

MDT measurement result=[cell measurement results, ECGI, PCI matching ECGI, indication 1, indication 2, indication 3, indication 4, number of detected cells]

The serving cell presence indicator (or indication 4) is the indicator indicating whether the serving cell of the UE exists at the time when the MDT measurement result has been logged.

Figure 5:
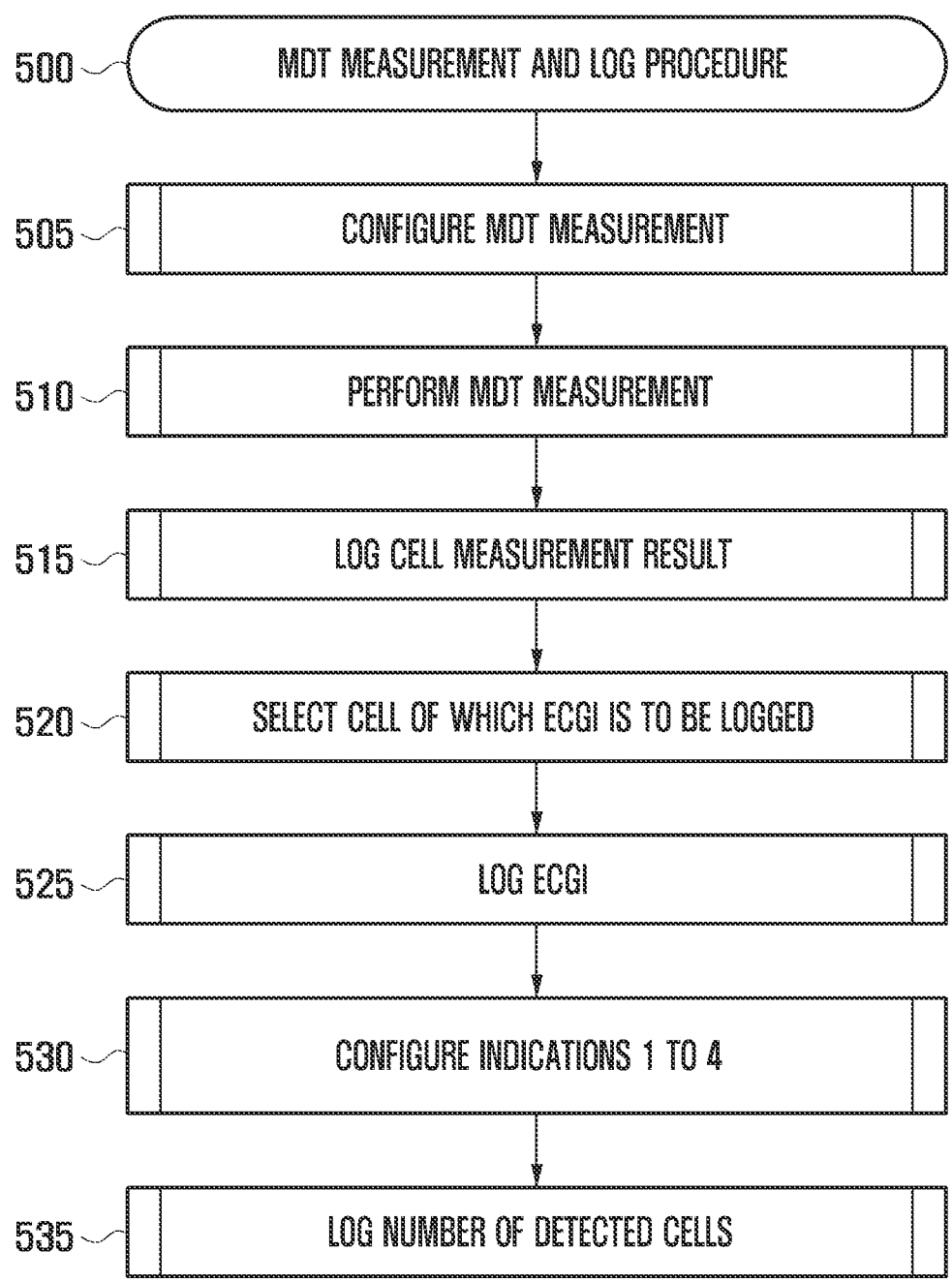
FIG. 5 is a flowchart illustrating the UE operation in the case that the MDT measurement result is formatted without measurement result on the serving cell.

A description is made of the operation in the case where the MDT measurement result is formatted without serving cell measurement result, in more detail, with reference to FIG. 5.

The UE first receives the MDT measurement configuration information from the eNB to configure the MDT measurement at step 505. If the MDT measurement is configured to be performed in the idle mode, the UE waits until the RRC connection is released and starts MDT measurement upon release of the RRC connection at step 510. For example, the MDT measurement can be of measuring and logging the signal strength of the cell periodically.

If the MDT measurement occasion arrives, the UE logs the measurement result of n cells having the strongest signal strengths among the cells detected at the corresponding time into the MDT measurement result at step 515. The UE selects a cell of which ECGI is logged at step 520. When selecting the cell of which ECGI is logged, the UE may selects the cell of which ECGI has been already known at the corresponding time. Since the ECGI is acquired in the system information, the cell of which ECTI has been known already is likely to be the serving cell at the corresponding time. If no serving cell exists at the corresponding time, the UE attempts acquiring ECGI from the cells having the strongest signal strengths and selects the cell of which ECGI has been acquired successfully.

The UE logs the ECGI of the selected cell the PCI of the cell in the MDT measurement result at step 525. The UE configures the indication 1, indication 2, indication 3, and indication 4 at step 530. The indication 4 is the indicator indicating whether the serving cell exists at the corresponding time and, if no serving cell exists, the UE sets the indication 4 to YES and, otherwise, NO. The UE logs the number of the detected cells at step 535 and terminates the MDT measurement result logging operation.

As described above, the network entity is capable of estimating the location where the UE has performed MDT measurement based on the neighbor cell measurement result and ECGI included in the MDT measurement result. However, there may be the situation where since the channel condition of the serving cell is good enough at the corresponding time, i.e. the signal strength of the serving cell is greater than the threshold value such as Sintrasearch or Sintersearch, no serving cell measurement has been performed. In this case, although the UE may log only the serving cell measurement result, the MDT measurement result without neighbor cell measurement result has low usability. Accordingly, the present invention proposes a method for logging MDT measurement result in which the UE determines whether there is neighbor cell measurement result at the MDT measurement resulting logging occasion to perform logging at a long interval in the case having no neighbor cell measurement result and at a short interval in the case having the neighbor cell measurement result.

Figure 6:
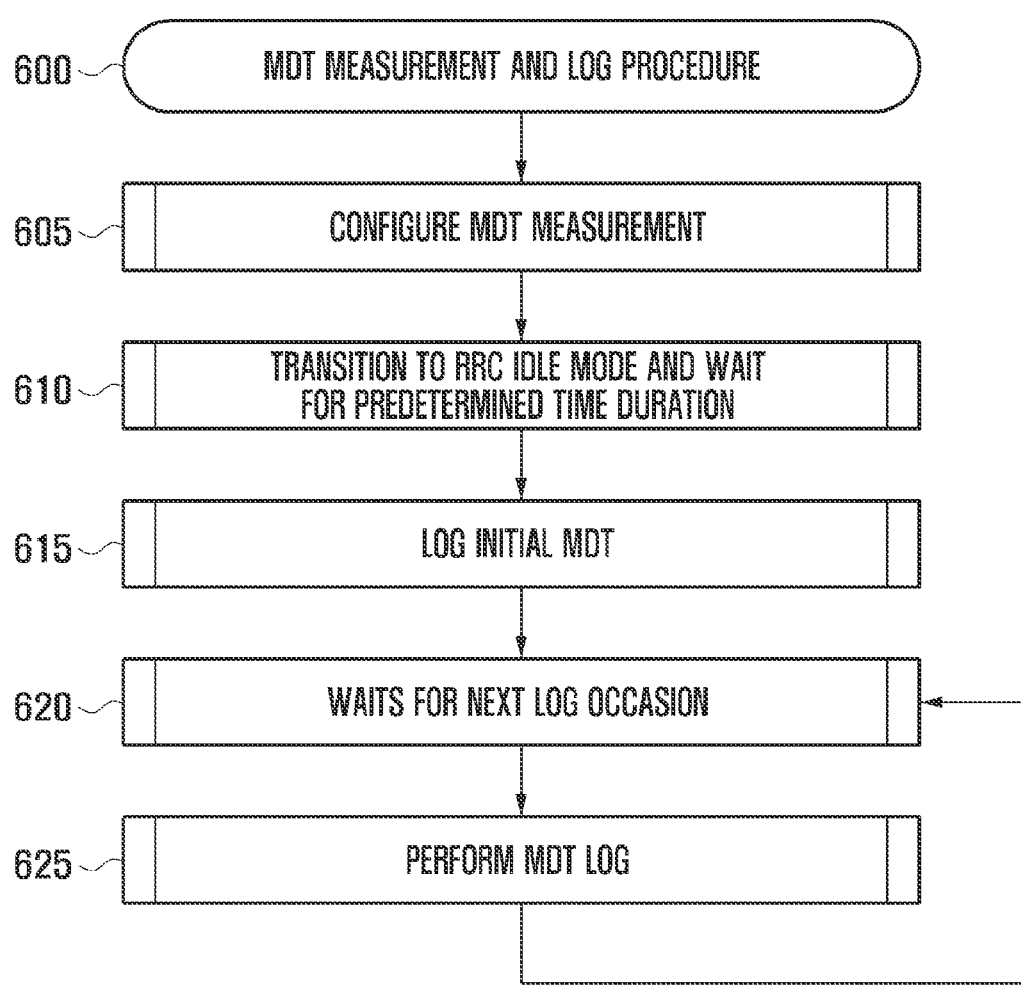
FIG. 6 is a flowchart illustrating an MDT procedure of the UE base on whether the neighbor cell measurement result exists.

FIG. 6 is a flowchart illustrating an MDT procedure of the UE base on whether the neighbor cell measurement result exists.

If the MDT measurement configuration message is received from the eNB, the UE configures the MDT measurement at step 605. The MDT measurement message may include the information of the MDT logging period. There may be multiple logging periods including a long period and a short period, the long period being applied to the case of no existence of neighbor cell measurement result and the short period being applied to the case of existence of neighbor cell measurement result.

If the RRC connection is released, the UE waits for predetermined time duration at step 610 and starts initial logging at step 615. Typically, if the RRC connection is released, the UE starts measurement to the neighbor cells for selecting the serving cell. It is preferred that the UE in the idle mode starts the MDT logging after the measurement has been continued as long as guaranteeing an appropriate reliability. Accordingly, the UE performs the first MDT logging after predetermined time duration other than immediately after transition to the idle mode at step 615. According to an embodiment of the present invention, the predetermined time duration may be expressed as a multiple of DRX period of the UE. Afterward, the UE performs the MDT logging periodically at a predetermined interval.

After performing the first MDT logging, the UE waits for the next MDT logging occasion at step 620. The next MDT logging occasion can be determined by the MDT logging period configured through the MDT measurement configuration message. For example, the $[n+1]^{th}$ logging occasion arrives after the MDT logging period since the $n^{th}$ MDT logging occasion. The MDT logging period can be a long period or a short period according to the signal strength of the serving cell. That is, if the signal strength of the serving cell is equal to or greater than a predetermined threshold value, the UE applies the long period and, otherwise, the short period. If the next MDT logging occasion arrives, the UE performs MDT logging at step 625 and returns the procedure to step 620 to repeat the MDT logging operation.

Figure 7:
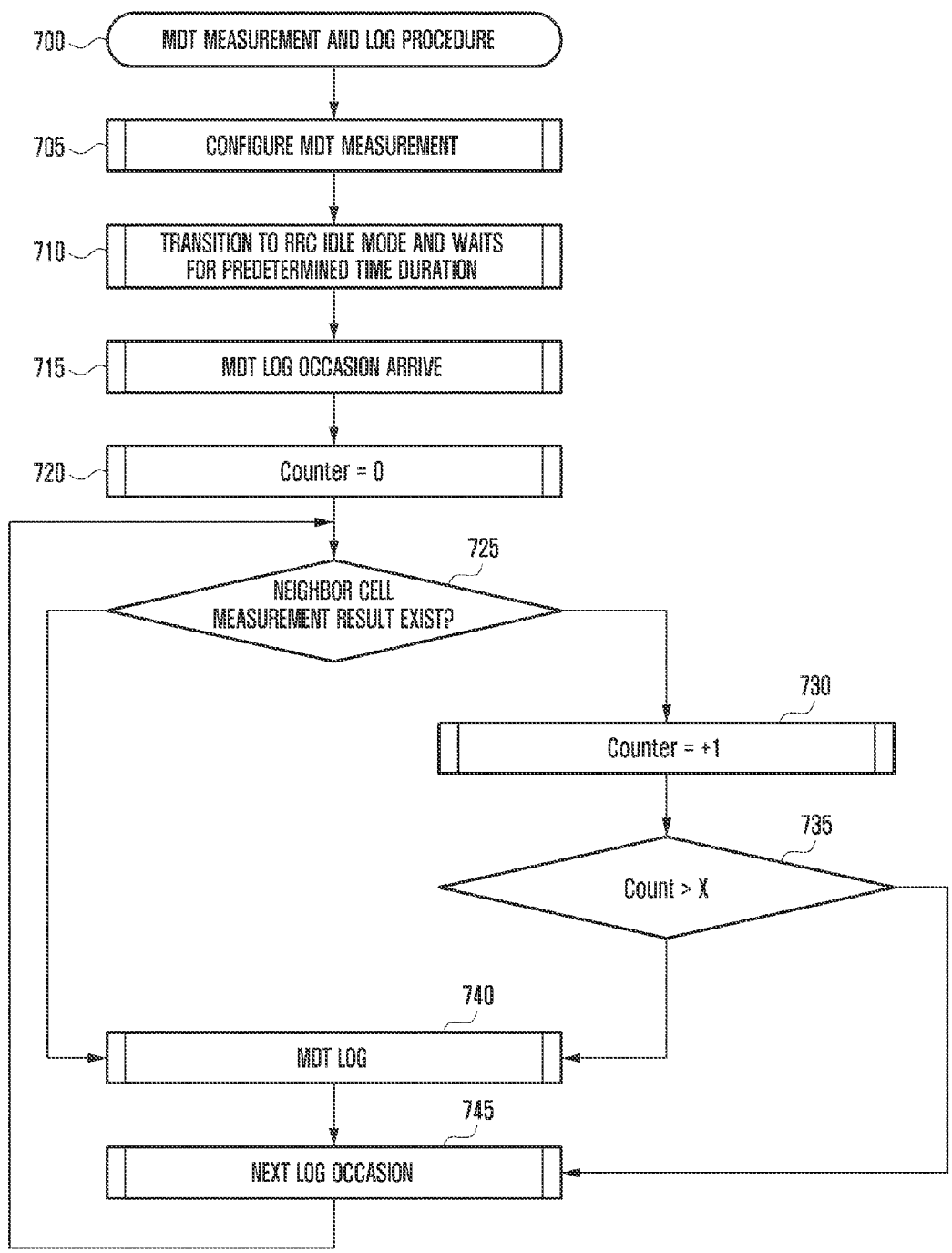
FIG. 7 is a flowchart illustrating a UE operation with more frequent logging with the existence of neighbor cell measurement result according to another embodiment of the present invention.

FIG. 7 is a flowchart illustrating a UE operation with more frequent logging with the existence of neighbor cell measurement result according to another embodiment of the present invention.

The UE first receives the MDT measurement configuration message from the eNB to configure the MDT measurement at step 705. The configuration message may include the MDT logging period information. If the RRC connection is released, the UE waits for predetermined time duration.

If the first logging occasion arrives at step 715, the UE initializes a COUNTER to 0 at step 720. Next, the UE determines whether any neighbor cell measurement result exists at the first logging occasion at step 725. Also, the UE may determine whether the signal strength of the serving cell is equal to or less than a predetermined threshold value at the first logging occasion.

If the neighbor cell measurement result exists or if the signal strength of the serving cell is equal to or less than the threshold value, the UE performs MDT logging at step 740.

Otherwise, if no neighbor cell measurement result exists or if the signal strength of the serving cell is greater than the threshold value, the UE increment the COUNTER by 1 at step 730. Next, the UE determines whether the COUNTER is greater than the threshold value at step 735. The COUNTER increases by 1 whenever the UE skips the MDT logging and thus, if the COUNTER is greater than the threshold value, this means that the MDT logging has been skipped continuously more than a predetermined number of times, such that in order to prevent the MDT logging to many times the UE performs MDT measurement at step 740. If the COUNTER is equal to or less than the threshold value, this means that the MDT logging can be skipped and thus the UE skips MDT logging and waits for the next logging occasion at step 745.

In order to simplify the UE operation, the procedure can be modified such that the MDT logging is performed only when the neighbor cell measurement result exists or the UE location indication information exists. That is, the UE determines whether any neighbor cell measurement result (or other information for estimating the UE location) exists at the logging occasion and, if exists, performs MDT logging and, otherwise, skips MDT logging.

According to a preferred embodiment of the present invention, the MDT measurement result reported by the UE to the eNB may include location information. Particularly when GNSS (Global Navigation Satellite System) is used, the UE is capable of acquiring accurate location information. Although the UE is equipped with the GNSS receiver, it is preferred not to activate the GNSS receiver always to avoid waste of power. In order to include the GNSS location information in the MDT measurement result, it is necessary to activate the GNSS receiver at an appropriate timing. For the main purpose of MDT, the location information recorded in the service coverage hole is very useful. This is because the location information makes it possible to estimate the location and size of the service coverage hole. If the Reference Signal Received Power (RSRP) value received from a specific cell is greater than a predetermined threshold value (first threshold value), the cell transmitted the reference signal can be defined as serving cell. This criterion is referred to as S-criterion and, if this criterion is not fulfilled over 10 seconds, the UE enters a selection (hereinafter, Any Cell Selection) state. In this state, the UE searches for a serving cell or a cell for providing limited service and thus it is possible to assume that the UE is in the service coverage hole. If the current serving cell does not satisfy the S-criterion, there is a margin of 10 seconds until the UE enters the 'Any Cell Selection' state such that, by activating the GNSS receiver when the S-criterion is not satisfied, it is possible to acquire the UE location at the time when the UE enters the service coverage hole. Based on the above description, the GSNN receiver activation timing in association with the UE's entry to the service coverage hole is described with reference to FIG. 8.

Figure 8:
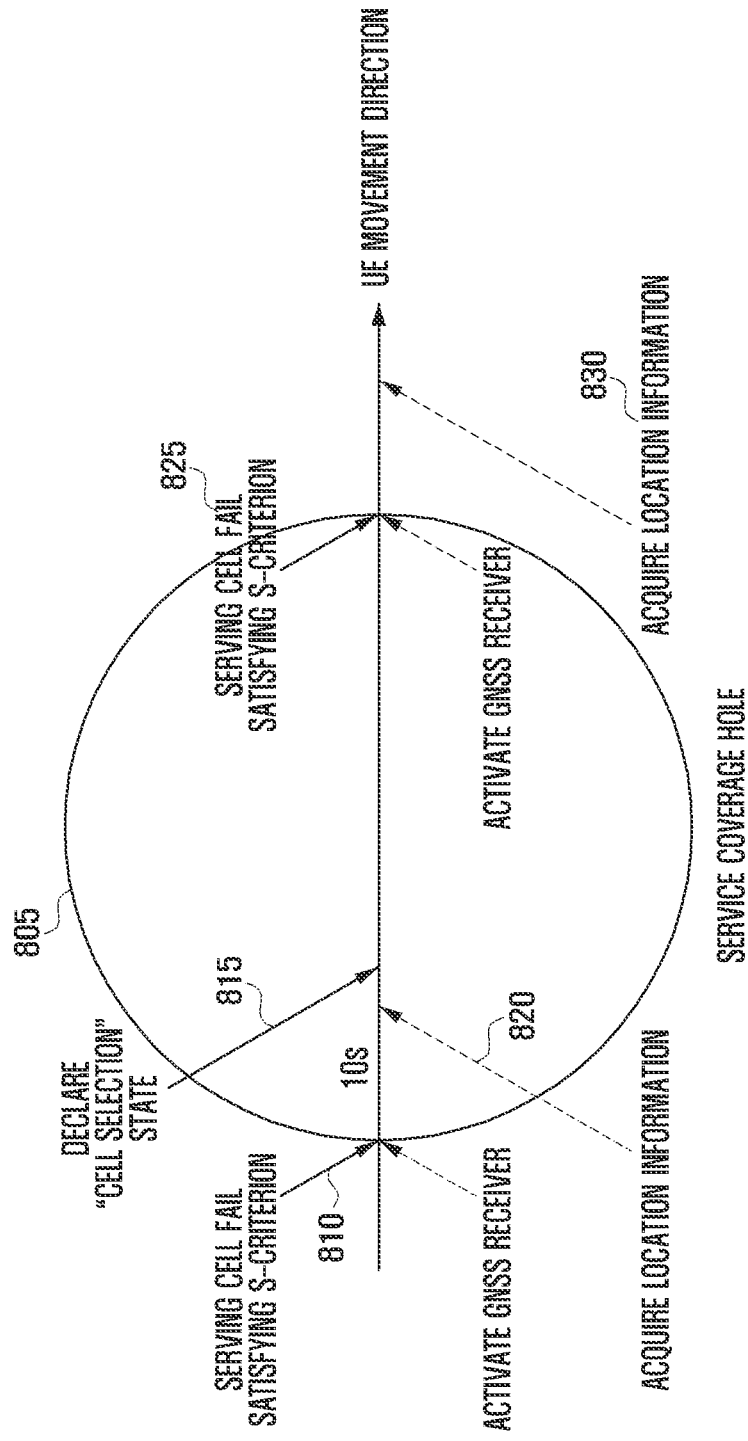
FIG. 8 is a diagram illustrating a GNSS receiver activation timing of the UE entering the service coverage hole.

FIG. 8 is a diagram illustrating a GNSS receiver activation timing of the UE entering the service coverage hole. In FIG. 8, it is assumed that the UE moves from left to right. It is assumed that the inside of the circle 805 is the service coverage hole.

If the UE enters the service coverage hole 805, the current serving cell fails satisfying the S-criterion at step 810. If failing the S-criterion continues over 10 seconds, the UE declares 'Any Cell Selection' state at step 815.

If it enters the service coverage hole, the UE activates the GNSS receiver to acquire the location information at the timing 810. Next, the UE acquires the location information by means of its GNSS for ten seconds and logs the acquired location information. Afterward, the UE deactivates the GNSS receiver to avoid power waste.

If the current serving cell satisfies the S-criterion in 10 seconds, the UE stops the operation of the GNSS receiver.

In FIG. 8, if the it enters the service coverage hole 805 and then moves continuously out of the service coverage hole 805, the UE searches for a serving cell satisfying the S-criterion again. That is, the UE searches for a serving cell at the timing 825. After declaring 'Any Cell Selection' state, the UE activates the GNSS receiver again at the timing for attempting service cell search. After the elapse of predetermined time duration, the UE acquire and logs the location information at the timing 830.

In the above embodiment, there may be a time offset between the activation of the GNSS receiver and the acquisition of the location information. Accordingly, if it activates the GNSS receiver at the time point when the current serving cells does not satisfy the S-criterion, the GNSS receives continues operation before entering the 'Any Cell Selection' state and thus it fails to guarantee the acquisition of the location information.

Accordingly, it is necessary for the UE to activate the GNSS receiver before S-criterion is fulfilled. In the present invention, an RSRP threshold value (second threshold value) greater than the RSRP threshold value (first threshold value) of the S-criterion is defined to activate the GNSS receiver in advance. Since the new RSRP threshold value (second threshold value) appears prior to the S-criterion of the UE, the UE is capable of activating the GNSS receiver before it enters the service coverage hole, and this is referred to as SGNSS-criterion.

Figure 9:
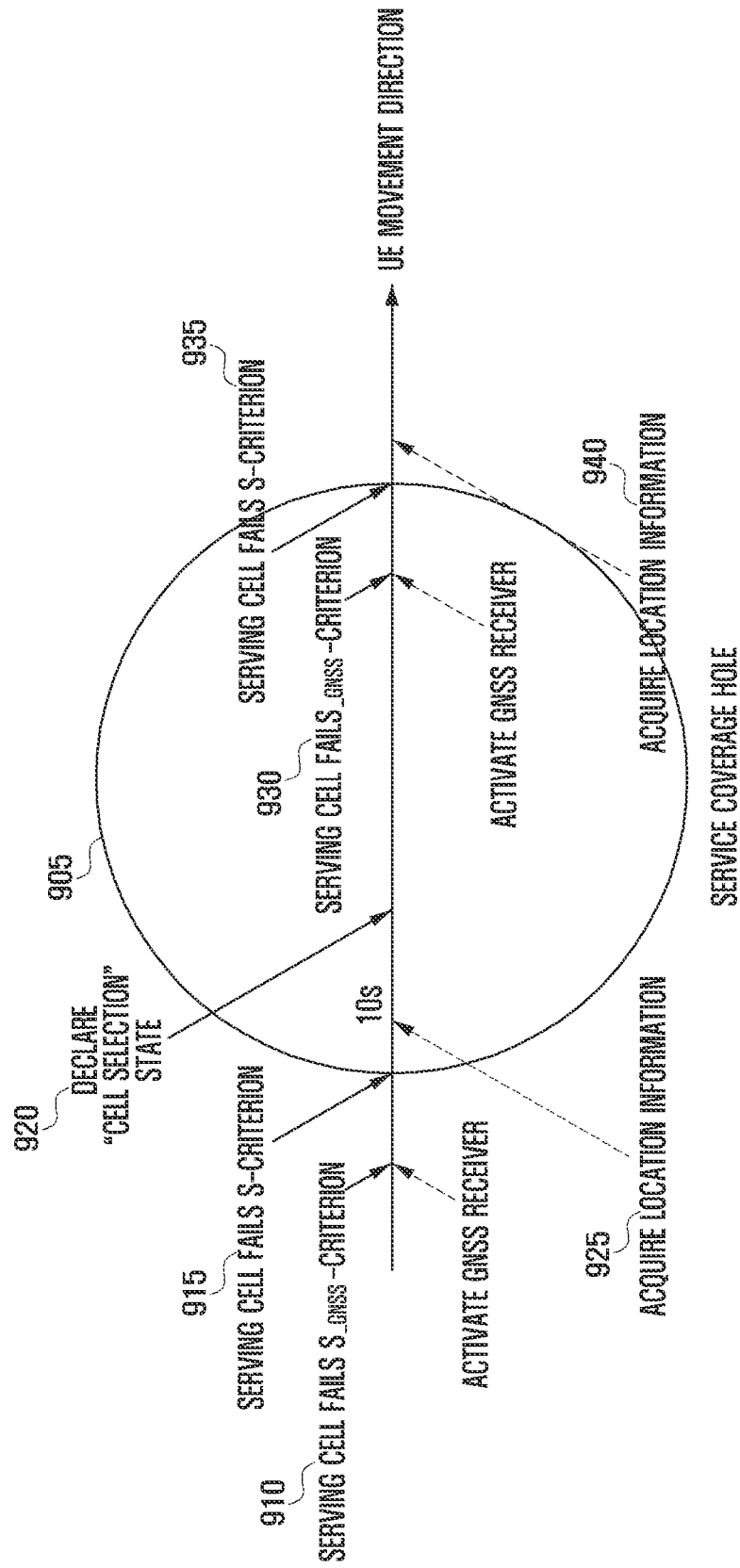
FIG. 9 is a diagram illustrating a method for activating the GNSS receiver before S-criterion, i.e. at SGNSS-criterion.

FIG. 9 is a diagram illustrating a method for activating the GNSS receiver before S-criterion, i.e. at SGNSS-criterion.

If the UE approaches the service coverage hole 905, the serving cell fails satisfying the SGNSS-criterion at the timing 910. At this time, the UE activates the GNSS receiver. Afterward, the serving cell fails satisfying the S-criterion at the timing 915 and then enters the 'Any Cell Selection' state at the timing 920. The UE starts activation of the GNSS to acquire the location information at the timing 925 before entering the 'Any Cell Selection' state. Preferably, the location acquisition timing of the UE matches the entry of the service coverage hole 905.

Afterward, the UE deactivates the GNSS receiver to reduce the power consumption. If the serving cell recovers the SGNSS-criterion before the UE enters the 'Any Cell Selection' state, the UE stops GNSS location information acquisition operation. Afterward, if the serving cell satisfies S'_GNSS-criterion, the UE activates the GNSS receiver at the timing 930. S'_GNSS-criterion has an RSRP threshold value (third threshold value) lower than the RSRP threshold value (first threshold value). This is because, since the GNSS receiver has to be activated in advance before the UE enters the service coverage hole when the UE moves from the service coverage hole 905 to the service coverage area, it is necessary to define the serving cell at the close timing although the reference signal received power from a specific cell satisfies the threshold value (third threshold value) lower than the original threshold value (first threshold value).

The serving cell satisfies the S-criterion at step 935 and acquires the location information around the corresponding timing 940.

Figure 10:
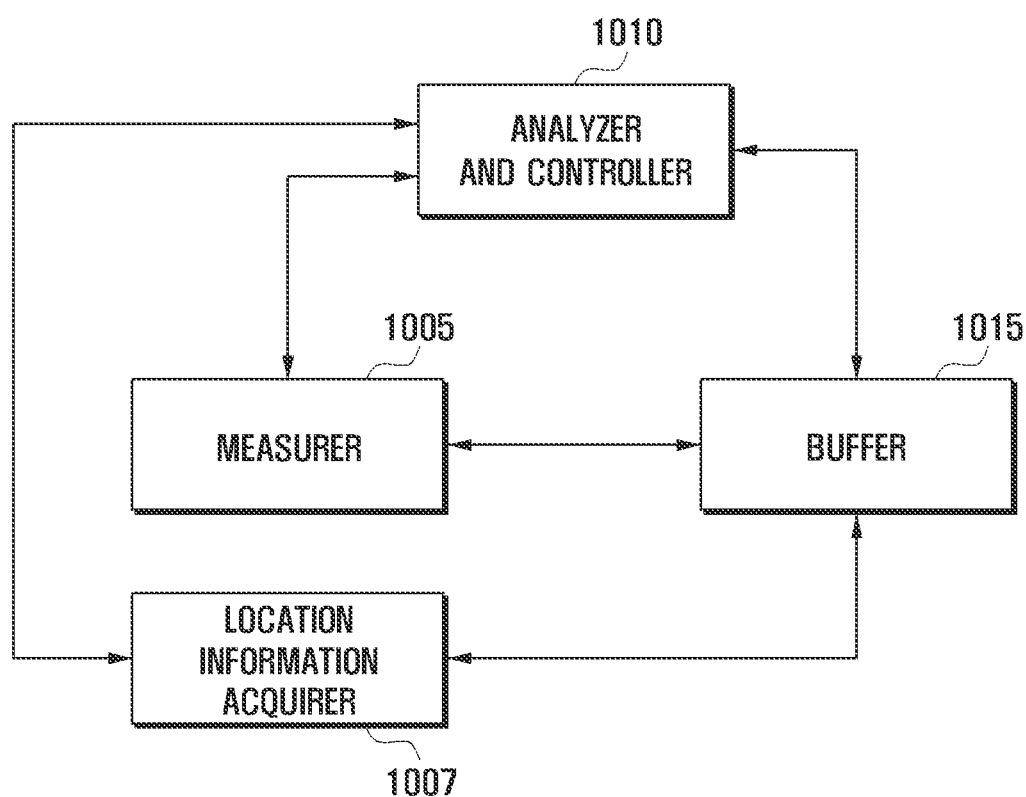
FIG. 10 is a block diagram illustrating an internal configuration of the UE for configuring the MDT measurement information according to an embodiment of the present invention.

FIG. 10 is a block diagram illustrating an internal configuration of the UE for configuring the MDT measurement information according to an embodiment of the present invention.

The measurer 1005 measures the signals from the serving and neighbor cells.

The location information acquirer (or location information acquisition module) 1007 acquires the location information of the UE. According to a preferred embodiment of the present invention, the location information acquirer may be a GNSS (Global Navigation Satellite System) receiver.

The analyzer and controller 1010 (or controller) compares the signal strength of the serving cell with Sintrasearch and Snonintrasearch to determine whether to measure the neighbor cells and instruct the measurer 1005 to perform measurement. The analyzer and controller 1010 is responsible for defining the configuration format when the corresponding information is logged.

In more detail, the controller 1010 controls logging the channel measurement information according to at least one of the criteria on whether the serving cell exists and whether the serving cell measurement result exists. If the serving cell exists, the controller 1010 controls logging the measurements of the serving and neighbor cells. The controller 1010 logs the ECGI (EUTRAN Cell Global Id) of the serving cell in the channel measurement information.

Otherwise, if no serving cell exists, the controller 101 configures, if the signal strength of the serving cell is equal to or less than an threshold value, the information indicating that the signal strength of the serving cell is equal to or less than the threshold value as the serving cell absence indicator (indicator 1) and determines, if the signal strength of the serving cell is greater than the threshold value, whether the measured serving cell is an access-barred cell. if it is determined that the measured serving cell is the access-barred cell, the controller 1010 configures the information on the access-barred cell as an access-barred cell indicator (indicator 2). The controller 1010 also logs the ECGI (EUTRAN Cell Global Id) of a certain cell among the neighbor cells in the channel measurement information.

Next, the controller 1010 is capable of configuring the information indicating whether the neighbor cells are measured as a neighbor cell measurement indicator (indicator 3) along with logging a number of the detected cells in the measurement procedure.

According to another embodiment of the present invention, the controller 1010 is capable of logging the measurement results of n cells having the best signal strength among the cells detected in the measurement procedure and the ECGI of the cell from which ECGI (EUTRAN Cell Global Id) is successfully acquired. In this case, the controller 1010 is capable of configuring the information indicating whether the serving cell exists as a serving cell presence indicator (indicator 4).

The controller 1010 is capable of controlling to report the UE capability or current status to the eNB in response to the request from the eNB according to an embodiment of the present invention. In more detail, if the UE battery status report command is received from the eNB, the controller 1010 generates a control message including the UE's residual battery amount and battery consumption amount information for predetermined time duration. Next, the controller 1010 transmits the generated control message to the eNB.

According to another embodiment of the present invention, the controller 1010 is capable of configuring the logging period differently according to whether the neighbor cell measurement result exists. That is, the controller 1010 determines whether any neighbor cell measurement result exists and configures, if no neighbor cell measurement result exists, a first period as the channel measurement result log period and, otherwise if any neighbor cell measurement result exists, a second period as the channel measurement result log period. In this case, the first period may be longer than the second period.

According to another embodiment of the present invention, if any neighbor cell measurement result exists or if the signal strength of the serving cell is equal to or less than a threshold value, the controller 1010 controls to log the measurement result. If no neighbor cell measurement result exists or if the signal strength of the serving cell is greater than the threshold value, the controller 1010 increases the counter value. If the counter value is equal to or less than a configured value, the controller 1010 controls to skip logging the measurement result and, otherwise if the counter value is greater than the configured value, to log the measurement result.

The controller 1010 determines the measurement result to be logged based on the serving cell presence/absence and its reason and neighbor cell measurement result presence/absence and its reason. The measurement information configured by the analyzer and controller 1010 is stored in the buffer 1015.

According to a preferred embodiment of the present invention, the controller 1010 is capable of acquiring the location information on the service coverage hole by means of the location information acquirer 1007 and including the location information in the channel measurement information.

In order to accomplish this, if the reference signal reception power received from the serving cell is equal to or less than a configured threshold value, the controller 1010 is capable of controlling the location information acquirer 1007 to acquire the location information of the UE. Once the location information acquisition completes and if the serving cell's reference signal reception power measured in the configured duration is greater than the configured threshold value, the controller 1010 controls to step the location information acquisition operation. After stopping the location information acquisition operation in the service coverage hole, if the reference signal reception power from a specific cell is greater than the configured threshold value, the controller 1010 controls the location information acquirer 1007 to acquire the location information of the UE.

According to another preferred embodiment of the present invention, the controller 1010 is capable of activating the location information acquirer 1007 in advance before the UE enters the service coverage hole. After it enters the service coverage hole, the controller 1010 is capable of activating the location information acquirer 1007 in advance before the UE moves to the service coverage area. In this case, since the activation timing of the location information acquirer 1007 has been described with reference to FIG. 9, detailed description thereon is omitted herein.

What is claimed is:

1. A channel measurement information log method of a terminal in a mobile communication system, comprising:
   receiving measurement configuration information from a base station;
   measuring one or more cells based on the measurement configuration information;
   identifying that the terminal is in an idle mode;
   configuring, if at least one cell having a signal strength greater than a threshold value does not exist, a first indicator indicating that a serving cell does not exist;
   configuring, if at least one cell having a signal strength greater than the threshold value exists and the at least one cell is an access-barred cell, a second indicator indicating that the at least one cell is the access-barred cell;
   logging channel measurement information including at least one measurement result based on the measurement; and
   transmitting the logged channel measurement information including at least one of the first indicator and the second indicator to the base station.

2. The method of claim 1, wherein the logging further comprises logging, if the serving cell exists, a measurement result of the serving cell and neighbor cells.

3. The method of claim 2, wherein the logging further comprises logging evolved universal terrestrial radio access network (EUTRAN) cell global identifier (ECGI) of the serving cell and ECGI of one of the neighbor cells.

4. The method of claim 1, wherein the logging further comprises:
   logging a number of cells detected in the measuring, and
   configuring information indicating whether a neighbor cell is measured as a neighbor cell measurement indicator.

5. The method of claim 1, wherein the logging further comprises:
   logging measurement results to n cells having best signal strengths among the cells detected in measurement, and
   logging, among the n cells, evolved universal terrestrial radio access network (EUTRAN) cell global identifier (ECGI) of the cell from which the ECGI is acquired successfully.

6. The method of claim 5, wherein the logging further comprises configuring information indicating whether the serving cell exists as a serving cell presence indicator.

7. An apparatus for logging channel measurement information in a mobile communication, comprising:
   a transceiver configured to transmit and receive a signal; and
   a controller configured to:
      receive measurement configuration information from a base station,
      measure one or more cells based on the measurement configuration information,
      identify that the terminal is in an idle mode,
      configure, if at least one cell having a signal strength greater than a threshold value does not exist, a first indicator indicating that a serving cell does not exist,
      configure, if at least one cell having a signal strength greater than the threshold value exists and the at least one cell is an access-barred cell, a second indicator indicating that the at least one cell is the access-barred cell,
      log channel measurement information including at least one measurement result based on the measurement, and
      transmit the logged channel measurement information including at least one of the first indicator and the second indicator to the base station.

8. The apparatus of claim 7, wherein the controller is further configured to log, if the serving cell exists, a measurement result associated with the serving cell and neighbor cells.

9. The apparatus of claim 8, wherein the controller is further configured to log evolved universal terrestrial radio access network (EUTRAN) cell global identifier (ECGI) of the serving cell and ECGI of one of the neighbor cells.

10. The apparatus of claim 7, wherein the controller is further configured to:
    log a number of cells detected in the measuring, and
    configure information indicating whether a neighbor cell is measured as a neighbor cell measurement indicator.

11. The apparatus of claim 7, wherein the controller is further configured to:
    log measurement results to n cells having best signal strengths among the cells detected in measurement, and
    log among the n cells, evolved universal terrestrial radio access network (EUTRAN) cell global identifier (ECGI) of the cell from which the ECGI is acquired successfully.

12. The apparatus of claim 11, wherein the controller is further configured to configure information indicating whether the serving cell exists as a serving cell presence indicator.

* * * * *